US008106828B1

(12) United States Patent  
Do et al.

(10) Patent No.: US 8,106,828 B1
(45) Date of Patent: *Jan. 31, 2012

(54) LOCATION IDENTIFICATION USING BROADCAST WIRELESS SIGNAL SIGNATURES

(75) Inventors: Ju-Yong Do, Stanford, CA (US); Andy Lee, Union City, CA (US); David Gotwisner, Castro Valley, CA (US); Dimitri Rubin, Cupertino, CA (US); Matthew Rabinowitz, Portola Valley, CA (US)

(73) Assignee: TruePosition, Inc., Berwyn, PA (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/209,971

(22) Filed: Sep. 12, 2008

Related U.S. Application Data

(63) Continuation-in-part of application No. 11/284,800, filed on Nov. 22, 2005.

(60) Provisional application No. 60/971,752, filed on Sep. 12, 2007.

(51) Int. Cl.
*G01S 3/02* (2006.01)
(52) U.S. Cl. ........................................ 342/463; 342/451
(58) Field of Classification Search .................. 342/450, 342/458, 463–465, 451; 455/456.2, 456.6
See application file for complete search history.

(56) References Cited

U.S. PATENT DOCUMENTS

| | | | |
|---|---|---|---|
| 4,555,707 A | 11/1985 | Connelly | |
| 4,652,884 A | 3/1987 | Starker | |
| 4,700,306 A | 10/1987 | Wallmander | |
| 4,894,662 A | 1/1990 | Counselman | |
| 5,045,861 A | 9/1991 | Duffett-Smith | |
| 5,157,686 A | 10/1992 | Omura et al. | |
| 5,166,952 A | 11/1992 | Omura et al. | |
| 5,271,034 A | 12/1993 | Abaunza | |
| 5,323,322 A | 6/1994 | Mueller et al. | |
| 5,398,034 A | 3/1995 | Spilker, Jr. | |
| 5,481,316 A | 1/1996 | Patel | |
| 5,504,492 A | 4/1996 | Class et al. | |
| 5,510,801 A | 4/1996 | Engelbrecht et al. | |
| 5,604,765 A | 2/1997 | Bruno et al. | |
| 5,630,206 A | 5/1997 | Urban et al. | |
| 5,648,982 A | 7/1997 | Durrant et al. | |

(Continued)

FOREIGN PATENT DOCUMENTS

DE        3242997 A1    5/1984

(Continued)

OTHER PUBLICATIONS

U.S. Appl. No. 12/333,445, filed Dec. 12, 2008, Rubin, et al.

(Continued)

*Primary Examiner* — Dao Phan
(74) *Attorney, Agent, or Firm* — Woodcock Washburn LLP

(57) ABSTRACT

An apparatus for location identification using broadcast wireless signal signatures includes a receiver to receive first measurements of a plurality of wireless television signals. The first measurements are made by a remote device receiving the plurality of wireless television signals. In addition, the apparatus includes a processor to select one or more of a plurality of possible locations of the remote device based on the first measurements and a plurality of associations each associating one of the possible locations with expected values. Moreover, the receiver receives second measurements of the wireless television signals made by one or more monitor units, and the processor generates the expected values for the first measurements and the associations based on the second measurements and the locations of the one or more monitor units.

24 Claims, 6 Drawing Sheets

U.S. PATENT DOCUMENTS

| | | | |
|---|---|---|---|
| 5,774,829 | A | 6/1998 | Cisneros et al. |
| 5,784,339 | A | 7/1998 | Woodsum et al. |
| 5,835,060 | A | 11/1998 | Czarnecki et al. |
| 5,920,284 | A | 7/1999 | Victor |
| 5,952,958 | A | 9/1999 | Speasl et al. |
| 5,953,311 | A | 9/1999 | Davies et al. |
| 6,006,097 | A | 12/1999 | Hornfeldt et al. |
| 6,016,119 | A | 1/2000 | Krasner |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,144,413 | A | 11/2000 | Zatsman |
| 6,147,642 | A | 11/2000 | Perry et al. |
| 6,181,921 | B1 | 1/2001 | Konisi et al. |
| 6,184,921 | B1 | 2/2001 | Limberg |
| 6,201,497 | B1 | 3/2001 | Snyder et al. |
| 6,215,778 | B1 | 4/2001 | Lomp et al. |
| 6,289,280 | B1 | 9/2001 | Fernandez-Corbaton et al. |
| 6,317,452 | B1 | 11/2001 | Durrant et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,400,753 | B1 | 6/2002 | Kohli et al. |
| 6,433,740 | B1 | 8/2002 | Gilhousen |
| 6,437,832 | B1 | 8/2002 | Grabb et al. |
| 6,484,034 | B1 | 11/2002 | Tsunehara et al. |
| 6,522,297 | B1 | 2/2003 | Rabinowitz et al. |
| 6,559,800 | B2 | 5/2003 | Rabinowitz et al. |
| 6,559,894 | B2 | 5/2003 | Omura et al. |
| 6,590,529 | B2 | 7/2003 | Schwoegler |
| 6,646,603 | B2 | 11/2003 | Dooley et al. |
| 6,717,547 | B2 | 4/2004 | Spilker, Jr. et al. |
| 6,727,847 | B2 | 4/2004 | Rabinowitz et al. |
| 6,753,812 | B2 | 6/2004 | Rabinowitz et al. |
| 6,806,830 | B2 | 10/2004 | Panasik et al. |
| 6,839,024 | B2 | 1/2005 | Spilker, Jr. et al. |
| 6,859,173 | B2 | 2/2005 | Spilker, Jr. et al. |
| 6,861,984 | B2 | 3/2005 | Rabinowitz et al. |
| 6,879,286 | B2 | 4/2005 | Rabinowitz et al. |
| 6,914,560 | B2 | 7/2005 | Spilker, Jr. et al. |
| 6,917,328 | B2 | 7/2005 | Rabinowitz et al. |
| 6,937,866 | B2 | 8/2005 | Duffett-Smith et al. |
| 6,952,182 | B2 | 10/2005 | Spilker, Jr. et al. |
| 6,961,020 | B2 | 11/2005 | Robinowitz et al. |
| 6,963,306 | B2 | 11/2005 | Spilker, Jr. et al. |
| 6,970,132 | B2 | 11/2005 | Spilker, Jr. et al. |
| 7,042,396 | B2 | 5/2006 | Omura et al. |
| 7,042,949 | B1 | 5/2006 | Omura et al. |
| 7,126,536 | B2 | 10/2006 | Rabinowitz et al. |
| 7,260,378 | B2 | 8/2007 | Holland et al. |
| 7,269,424 | B2 | 9/2007 | Camp, Jr. |
| 7,372,405 | B2 | 5/2008 | Rabinowitz et al. |
| 7,463,195 | B2 | 12/2008 | Rabinowitz et al. |
| 2002/0122003 | A1 | 9/2002 | Patwari et al. |
| 2002/0184653 | A1 | 12/2002 | Pierce et al. |
| 2002/0199196 | A1 | 12/2002 | Rabinowitz et al. |
| 2003/0162547 | A1 | 8/2003 | McNair |
| 2004/0073914 | A1 | 4/2004 | Spilker et al. |
| 2004/0201779 | A1 | 10/2004 | Spilker et al. |
| 2005/0066373 | A1 | 3/2005 | Rabinowitz |
| 2005/0251844 | A1 | 11/2005 | Martone et al. |
| 2007/0050824 | A1 | 3/2007 | Lee et al. |
| 2007/0121555 | A1 | 5/2007 | Burgess et al. |
| 2007/0131079 | A1 | 6/2007 | Opshaug et al. |
| 2007/0182633 | A1 | 8/2007 | Omura et al. |
| 2007/0296632 | A1 | 12/2007 | Opshaug et al. |

FOREIGN PATENT DOCUMENTS

| | | | |
|---|---|---|---|
| EP | 58129277 | | 8/1983 |
| GB | 2 222 922 | A | 3/1990 |
| GB | 2 254 508 | A | 10/1992 |

OTHER PUBLICATIONS

U.S. Appl. No. 12/351,841, filed Jan. 11, 2009, Lee, et al.
U.S. Appl. No. 12/263,731, Rabinowitz, et al.
U.S. Appl. No. 12/476,992, Do, et al.
U.S. Appl. No. 10/008,613, Pierce, et al.
U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/117,676, Rabinowitz, et al.
U.S. Appl. No. 12/168,141, Furman, et al.
Parkinson, B.W., et al., "Autonomous GPS Integrity Monitoring Using the Pseudorange Residual," *Journal of the Institute of Navigation* (1988), vol. 35, No. 2, pp. 255-274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.
Spilker, Jr., J.J., "Fundamentals of Signal Tracking Theory," *Global Positioning System: Theory and Applications* (1994), vol. 1, Chapter 7, pp. 245-327.
Van Dierendock, A.J., "GPS Receivers," *Global Positioning System: Theory and Applications* (1995), vol. 1, Chapter 8, pp. 329-407.
Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, pp. 1449-1453, vol. 2, XP010520871, 2000, Piscataway, NJ, USA, IEEE, USA, ISBN; 9-7803-6463-5, Chapter I and III.
Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.
Duffett-Smith, et al., Precise Time Transfer in a Mobile Radio Terminal, ION NTM 2005, Jan. 24-26, 2005, San Diego, CA, pp. 1101-1106.

LOCATION IDENTIFICATION USING BROADCAST WIRELESS SIGNAL SIGNATURES

CROSS-REFERENCE TO RELATED APPLICATIONS

This application is a continuation-in-part of U.S. Non-Provisional patent application Ser. No. 11/284,800 filed Nov. 22, 2005, the disclosure thereof incorporated by reference herein in its entirety.

This application claims the benefit under 35 U.S.C. §119(e) of U.S. Provisional Patent Application Ser. No. 60/971,752, filed Sep. 12, 2007, the disclosure of which is incorporated by reference herein in its entirety.

BACKGROUND

The present invention relates generally to position determination. More particularly, the present invention relates to location identification using broadcast wireless signal signatures.

SUMMARY

In general, in one aspect, an embodiment features an apparatus comprising: a receiver to receive first measurements of a plurality of wireless signals, wherein the first measurements are made by a remote device receiving the plurality of wireless signals; and a processor to select one or more of a plurality of possible locations of the remote device based on the first measurements and a plurality of associations each associating one of the possible locations with expected values for the first measurements for the one of the possible locations.

Embodiments of the apparatus can include one or more of the following features. In some embodiments, the receiver receives second measurements of the plurality of wireless signals, wherein the second measurements are made by one or more monitor units receiving the plurality of wireless signals, and wherein locations of the one or more monitor units are known; and the processor generates the expected values for the first measurements, and the associations, based on the second measurements and the locations of the one or more monitor units. In some embodiments, the wireless signals include broadcast television signals, wherein the broadcast television signals include synchronization pulses; and the first measurements, and the second measurements, include measurements of times of arrival of the synchronization pulses. In some embodiments, the wireless signals include digital broadcast television signals, wherein the digital broadcast television signals include data frames; and the first measurements, and the second measurements, include measurements of contents of the data frames, and wherein the first measurements, and the second measurements, of each digital broadcast television signal occur contemporaneously. In some embodiments, the wireless signals are selected from the group consisting of one or more broadcast television signals, one or more broadcast radio signals, one or more navigation aid signals, one or more cellular phone network signals, and one or more wireless local area network (LAN) signals; and wherein the first measurements are selected from the group consisting of a signal strength of the wireless signal, a type of the wireless signal, information content of the wireless signal, a frequency of the wireless signal, a frequency offset of the wireless signal from a predetermined frequency a time offset of the wireless signal, and a data frame of the wireless signal. Some embodiments comprise a transmitter to transmit a signal representing the one or more possible locations of the remote device. In some embodiments, the processor determines a precise location of the remote device based on the one or more possible locations, one or more of the plurality of wireless signals, and locations of transmitters of the one or more of the plurality of wireless signals.

In general, in one aspect, an embodiment features an apparatus comprising: means for receiving first measurements of a plurality of wireless signals, wherein the first measurements are made by a remote device receiving the plurality of wireless signals; and means for selecting one or more of a plurality of possible locations of the remote device based on the first measurements and a plurality of associations each associating one of the possible locations with expected values for the first measurements for the one of the possible locations.

Embodiments of the apparatus can include one or more of the following features. In some embodiments, the means for receiving receives second measurements of the plurality of wireless signals, wherein the second measurements are made by one or more monitor units receiving the plurality of wireless signals, and wherein locations of the one or more monitor units are known; and the means for processing generates the expected values for the first measurements, and the associations, based on the second measurements and the locations of the one or more monitor units. In some embodiments, the wireless signals include broadcast television signals, wherein the broadcast television signals include synchronization pulses; and wherein the first measurements, and the second measurements, include measurements of times of arrival of the synchronization pulses. In some embodiments, the wireless signals include digital broadcast television signals, wherein the digital broadcast television signals include data frames; and the first measurements, and the second measurements, include measurements of contents of the data frames, and wherein the first measurements, and the second measurements, of each digital broadcast television signal occur contemporaneously. In some embodiments, the wireless signals are selected from the group consisting of one or more broadcast television signals, one or more broadcast radio signals, one or more navigation aid signals, one or more cellular phone network signals, and one or more wireless local area network (LAN) signals; and wherein the first measurements are selected from the group consisting of a signal strength of the wireless signal, a type of the wireless signal, information content of the wireless signal, a frequency of the wireless signal, a frequency offset of the wireless signal from a predetermined frequency, a time offset of the wireless signal, and a data frame of the wireless signal. Some embodiments comprise means for transmitting a signal representing the one or more possible locations of the remote device. In some embodiments, the means for processing determines a precise location of the remote device based on the one or more possible locations, one or more of the plurality of wireless signals, and locations of transmitters of the one or more of the plurality of wireless signals.

In general, in one aspect, an embodiment features a method comprising: receiving first measurements of a plurality of wireless signals, wherein the first measurements are made by a remote device receiving the plurality of wireless signals; and selecting one or more of a plurality of possible locations of the remote device based on the first measurements and a plurality of associations each associating one of the possible locations with expected values for the first measurements for the one of the possible locations.

Embodiments of the method can include one or more of the following features. Some embodiments comprise receiving second measurements of the plurality of wireless signals, wherein the second measurements are made by one or more monitor units receiving the plurality of wireless signals, and wherein locations of the one or more monitor units are known; and generating the expected values for the first measurements, and the associations, based on the second measurements and the locations of the one or more monitor units. In some embodiments, the wireless signals include broadcast television signals, wherein the broadcast television signals include synchronization pulses; and the first measurements, and the second measurements, include measurements of times of arrival of the synchronization pulses. In some embodiments, the wireless signals include digital broadcast television signals, wherein the digital broadcast television signals include data frames; and wherein the first measurements, and the second measurements, include measurements of contents of the data frames, and wherein the first measurements, and the second measurements, of each digital broadcast television signal occur contemporaneously. In some embodiments, the wireless signals are selected from the group consisting of one or more broadcast television signals, one or more broadcast radio signals, one or more navigation aid signals, one or more cellular phone network signals, and one or more wireless local area network (LAN) signals; and wherein the first measurements are selected from the group consisting of a signal strength of the wireless signal, a type of the wireless signal, information content of the wireless signal, a frequency of the wireless signal, a frequency offset of the wireless signal from a predetermined frequency, a time offset of the wireless signal, and a data frame of the wireless signal. Some embodiments comprise transmitting a signal representing the one or more possible locations of the remote device. Some embodiments comprise determining a precise location of the remote device based on the one or more possible locations, one or more of the plurality of wireless signals, and locations of transmitters of the one or more of the plurality of wireless signals.

In general, in one aspect, an embodiment features computer-readable media embodying instructions executable by a computer to perform a method comprising: receiving first measurements of a plurality of wireless signals, wherein the first measurements are made by a remote device receiving the plurality of wireless signals; and selecting one or more of a plurality of possible locations of the remote device based on the first measurements and a plurality of associations each associating one of the possible locations with expected values for the first measurements for the one of the possible locations.

Embodiments of the computer-readable media can include one or more of the following features. Some embodiments comprise receiving second measurements of the plurality of wireless signals, wherein the second measurements are made by one or more monitor units receiving the plurality of wireless signals, and wherein locations of the one or more monitor units are known; and generating the expected values for the first measurements, and the associations, based on the second measurements and the locations of the one or more monitor units. In some embodiments, the wireless signals include broadcast television signals, wherein the broadcast television signals include synchronization pulses; and wherein the first measurements, and the second measurements, include measurements of times of arrival of the synchronization pulses. In some embodiments, the wireless signals include digital broadcast television signals, wherein the digital broadcast television signals include data frames; and wherein the first measurements, and the second measurements, include measurements of contents of the data frames, and wherein the first measurements, and the second measurements, of each digital broadcast television signal occur contemporaneously. In some embodiments, the wireless signals are selected from the group consisting of one or more broadcast television signals, one or more broadcast radio signals, one or more navigation aid signals, one or more cellular phone network signals, and one or more wireless local area network (LAN) signals; and wherein the first measurements are selected from the group consisting of a signal strength of the wireless signal, a type of the wireless signal, information content of the wireless signal, a frequency of the wireless signal, a frequency offset of the wireless signal from a predetermined frequency, a time offset of the wireless signal, and a data frame of the wireless signal. Some embodiments comprise causing transmission of a signal representing the one or more possible locations of the remote device. Some embodiments comprise determining a precise location of the remote device based on the one or more possible locations, one or more of the plurality of wireless signals, and locations of transmitters of the one or more of the plurality of wireless signals. The details of one or more implementations are set forth in the accompanying drawings and the description below. Other features will be apparent from the description and drawings, and from the claims.

Figure 1:
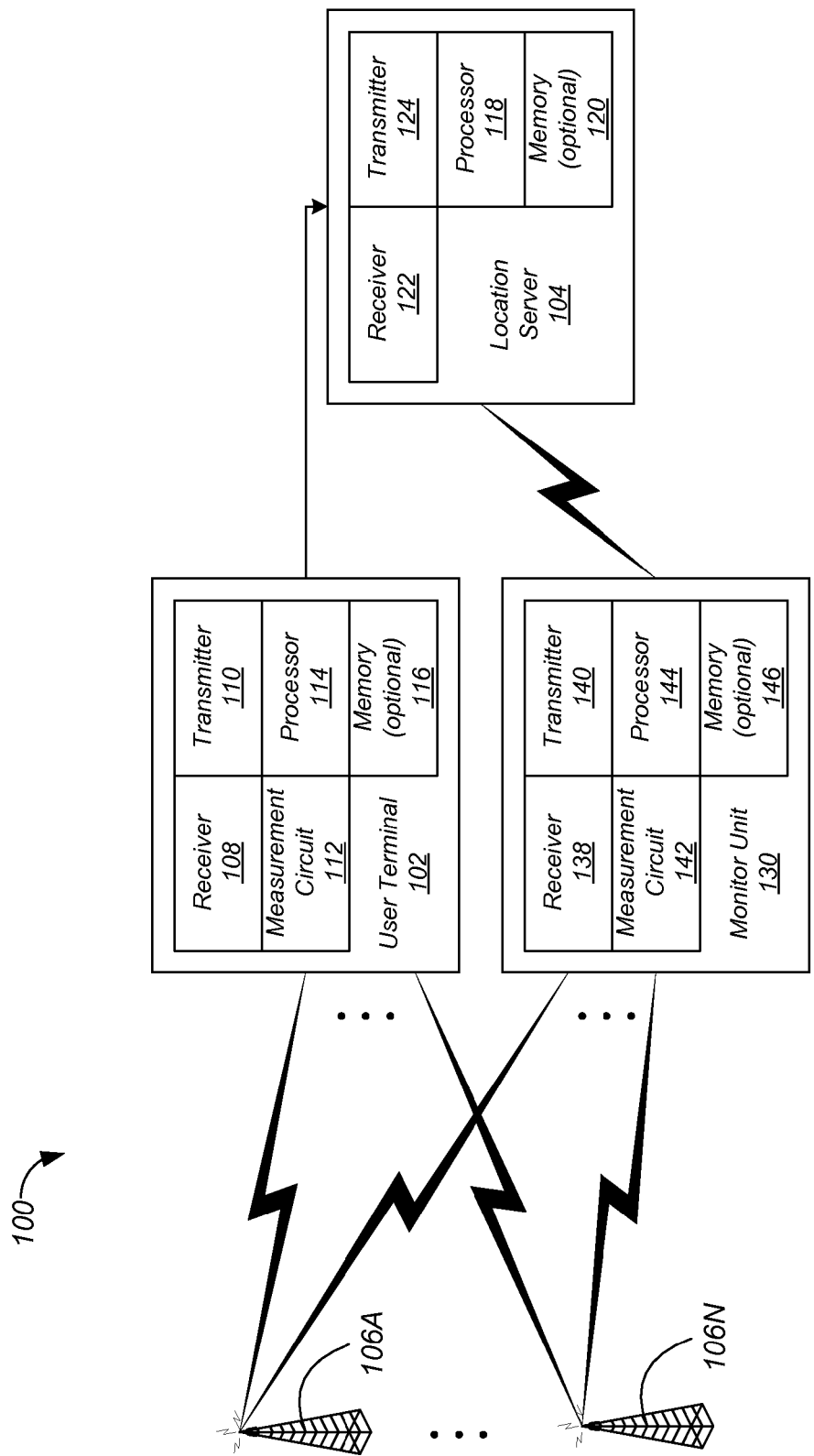
FIG. 1 shows a location identification system according to a preferred embodiment of the present invention.

The leading digit(s) of each reference numeral used in this specification indicates the number of the drawing in which the reference numeral first appears.

DETAILED DESCRIPTION

Embodiments of the present invention provide apparatus, methods, and computer programs for location identification using broadcast wireless signal signatures. While the wireless signals preferably include, and are discussed in terms of, broadcast television signals, the wireless signals can also or instead include broadcast radio signals, radio navigation aids, wireless local area network (LAN) signals, cellular phone networks, and the like. Embodiments of the present invention select one or more possible locations for an apparatus by comparing a signature assembled from measurements of the characteristics of the wireless signals, such as their signal strength, type, frequency, frequency offset, information content, time offset, data frame, and the like, to similar known signatures for known locations. The selected location can be used, in conjunction with measurements of the wireless signals, to calculate a precise location for the apparatus.

Television positioning technology uses broadcast TV signals to determine the exact location of an electronic device. This technique uses the principle of measuring propagation delays between TV broadcast towers and the device, combining measurements from multiple TV channels, and computing the device's precise location via multilateration, which is the fixing of a position by reference to the time difference of arrival of multiple signals. Television positioning techniques are disclosed in U.S. Pat. Nos. 7,126,536, 6,961,020, and 6,952,182 and U.S. patent application Ser. Nos. 10/867,577 filed Jun. 14, 2004 and 09/932,010 filed Aug. 17, 2001, the disclosures thereof incorporated by reference herein in their entirety. Positioning techniques using digital audio broadcast signals are disclosed in U.S. Pat. No. 7,042,396, the disclosure thereof incorporated by reference herein in its entirety.

However, it is desirable to know exactly which broadcast sources are being detected in this process. Television channels can be re-used in different cities, and the multilateration results will be quite different when using channel 2 from Los Angeles vs. channel 2 from New York. The position calculation depends on knowledge of the correct transmitter locations for each detected channel, which depends on knowing the approximate location of the device within the TV coverage domain. Once an approximate location of the device (e.g., to the nearest city) is identified, it becomes easy to determine the specific local television transmitters in use. This is because the television broadcast network is designed to have maximum clarity on every channel, which means having minimum interference on every channel. Transmitters on the same channel that can potentially interfere with each other are separated by great distances to avoid overlap. So for every detected channel, the specific transmitter source can be identified with very little ambiguity. For example, if the device is known to be somewhere in Los Angeles and it detects channel 2, it is clear that it is receiving KCBS, serving Los Angeles, and not WCBS, serving New York.

That still leaves the matter of how to identify the rough seed location of the device in the first place. There are many alternate technologies that can provide this information (e.g., GPS, cellular networks, etc.), but there are many situations where these other technologies are not available or lack coverage (e.g., GPS does not work indoors). In fact, one of the strengths of television-based positioning is that it can be used in places where other technologies are known to fail.

One possibility is to use the television signals themselves, and other signals of opportunity, to make this initial estimation. Since television, navigation aids, and other wireless broadcasts are regional, the specific combination of signals in any location is unique. When enough signal characteristics can be measured from received channels, it is possible to identify an approximate location based on a "wireless channel signature."

According to embodiments of the present invention, a device at an unknown location measures the local wireless channel signature, uses that signature to identify the approximate location of the device, and then optionally uses the approximate location to seed a precise television location computation. Thus without assistance from GPS and similar technologies, it is possible to determine a device's precise location in two steps: 1) identifying the approximate location with wireless channel signatures, and 2) computing the precise location with multilateration using the approximate location as a reference point. Thus a device can position itself from a "cold start" without other information such as GPS.

FIG. 1 shows a location identification system 100 according to a preferred embodiment of the present invention. System 100 comprises a user terminal 102, a location server 104, and a plurality of transmitters 106A-N. User terminal 102 comprises a receiver 108, a transmitter 110, a measurement circuit 112, a processor 114, and an optional memory 116. Location server 104 comprises a receiver 122, a transmitter 124, a processor 118, and an optional memory 120. User terminal 102 preferably communicates wirelessly with location server 104, although other modes are contemplated. In some embodiments, system 100 also includes one or more monitor units 130. Each monitor unit 130 includes a receiver 138, a transmitter 140, a measurement circuit 142, a processor 144, and an optional memory 146.

FIG. 1 is used to illustrate various aspects of the invention but the invention is not limited to this implementation. For example, the phrase "user terminal" is meant to refer to any object capable of implementing the techniques described herein. Examples of user terminals include PDAs, mobile phones, cars and other vehicles, and any object which could include a chip or software implementing the techniques. User terminal 102 is not intended to be limited to objects which are "terminals" or which are operated by "users."

Figure 2:
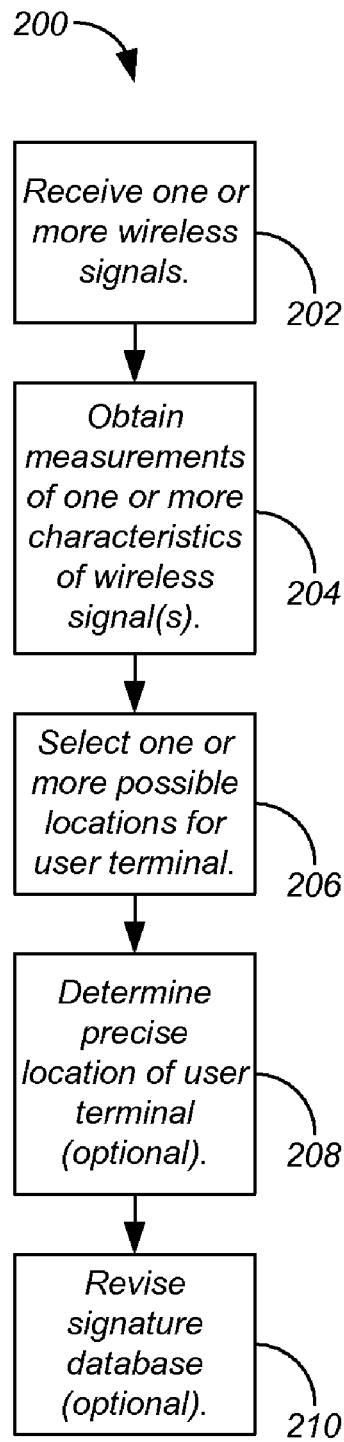
FIG. 2 shows a process for the system of FIG. 1 according to a preferred embodiment of the present invention.

FIG. 2 shows a process 200 for system 100 according to a preferred embodiment of the present invention. Receiver 108 of user terminal 102 receives one or more wireless signals (step 202). The wireless signals preferably include one or more broadcast television signals, but can also or instead include one or more broadcast radio signals, one or more wireless local area network (LAN) signals, and the like. Measurement circuit 112 obtains measurements of one or more characteristics of each of the wireless signals (step 204). The measurements together form a signature that is used to select one or more possible locations for user terminal 102 (step 206), as described in detail below. The measurements of the wireless signals can include characteristics such as signal strength, type, frequency, frequency offset, time offset, data frame, and others. For example, some TV stations broadcast a signal representing their call letters as part of the TV signal. As another example, some TV stations includes a mix of utility signals such as closed caption signals, ghost canceling reference signals, and the like. Such signals can be included in the signal signatures.

Television broadcasts are carefully regulated to maximize signal quality with a finite set of shared broadcast channels. Transmitters are selectively allocated so that broadcasters on the same channel are far enough away from each other to avoid interference. However, cities are geographically arranged with irregular shapes, sizes, and spacing. And by the same token, television transmitters are installed with irregular spacing and coverage footprints. This has the effect of shuffling or randomizing the order in which transmitters are allocated in order to maintain a "clean" network.

These variations in channel re-use patterns cause the active TV signal set (that is, all operating channels in an area) to vary from one city to the next. Each market is served by a subset of all the possible television transmissions (channels 2 through 69 in the U.S.). Similarly, other wireless broadcasts, like AM/FM radio, navigation aids, and cellular networks, can be combined to form regionally unique channel sets. When that set can be identified and is unique enough, it will match the theoretical channel set for the city of interest, or at least narrow the search down to a very small number of candidates.

In addition to a channel's presence or absence, there are other kinds of information that can be collected and compared to help identify specific transmitters and cities. When all the pieces of channel information are gathered and combined, they collectively form a wireless channel signature which can be used for localization. According to embodiments of the present invention, a signature measured by an electronic device in some unknown city is compared against a database of wireless channel signatures to find one or more matches. Channel characteristics used in wireless channel signatures preferably include channel allocations (whether a channel is present), channel types (whether a channel is analog, digital, or has some other broadcast type or sub-type), frequency, frequency offset (deviation from nominal channel frequencies), time offset, data frame, and the like.

As for TV channel allocation, most cities have several channels serving the average viewer. This gives the general public a variety of programming to choose from. For example, a typical U.S. city may have multiple network channels (e.g., ABC, CBS, NBC, FOX), public channels (e.g., PBS), shopping networks, and local access channels. Each of these television transmitters has been allocated a specific broadcast channel within the available television spectrum. In the U.S., there are 67 possible channel allocations (numbered 2 thru 36 and 38 thru 69). These allocations are regulated by the FCC to ensure that signals do not interfere with each other and thus provide the best possible viewing signal to the public. This allocation procedure takes into account signal strength, propagation losses, terrain features, and many other factors to determine which channels to allocate in each market. Similar channel allocation rules apply to nearly all broadcast signals (e.g., AM/FM radio, navigation aids, etc.).

In the most basic sense, this means that no two neighboring cities use the same channels. When many neighboring cities are considered together, the channel allocations in each city affect all of its neighbors and vice versa. The combination of channels allocated around each city will vary. In the U.S., there are over 4,000 licensed television broadcasts, each assigned to one of the 67 possible channels. This obviously means that each channel is used simultaneously by many transmitters throughout the country. The optimization efforts of the FCC make certain that all same-channel broadcasts are separated from each other to avoid overlap.

As for TV channel types, broadcast television technology originally began with analog modulation technologies like NTSC in the U.S., PAL, SECAM, and other variants in other countries. Now digital television standards are being introduced, like ATSC in the U.S., DVB-T in Europe, and ISDB-T in Japan.

At present, the U.S. is transmitting both analog (NTSC) and digital (ATSC) broadcasts simultaneously, giving consumers time to transition from their old analog receivers to new digital receivers. This means that within any given city, some broadcasters might be transmitting both analog and digital versions of their programming on separate channels. These digital channels have been introduced to each market using the same rules for minimizing channel interference, resulting in a mix of analog and digital channels that varies from market to market. For example, if a device detects a digital TV signal on channel Ci, it is clear that the device is not located in a city where the signal on channel Ci is analog. The same goes for all the other detected channels, Cj, Ck, etc. Considering all the channels together, the particular pattern of analog and digital signals become characteristic of specific geographic regions.

As for frequency and frequency offset, the FCC further optimizes the allocation of channels by specifying frequency offsets for individual transmissions. This means that instead of transmitting exactly on their designated channel, some broadcasters shift their transmission to slightly higher or lower frequencies. This helps spread broadcasters from each other in frequency, thus further reducing the potential for interference from neighboring broadcasters.

The direction (higher or lower) and amount of the offset is individually determined for each transmitter because it depends on which other transmitters are in the neighborhood. This gives each transmitter some distinctive characteristics, even compared to other transmitters on the same channel in other cities. So in addition to a channel's presence, its particular frequency offset adds more particularity to the channel signature that further refines its uniqueness, giving greater precision to the signature matching process. For example, if a device detects a signal on channel 2 with a negative 10 kHz offset, the device is probably not in a city where the local channel 2 offset is positive 10 kHz.

Some embodiments of the present invention employ a technique referred to herein as "time of arrival (TOA) matching," either alone or in combination with one or more other techniques describe herein. In TOA matching, the location of user terminal 102 is identified through the use of TOAs of predetermined signals at user terminal 102. While TOA matching is described with respect to broadcast television signals, any broadcast signal can be used, for example including broadcast radio signals, navigation aid signals, cellular phone network signals, wireless local area network (LAN) signals, and the like.

Broadcast television signals include periodic synchronization pulses or "sync" pulses that can be used for TOA matching. The repetition period is 24.2 ms for the ATSC signal and 16.7 ms for the NTSC signal. However, because television transmitters are not synchronized to one another, the time of transmission (TOT) of the sync pulses are not aligned to one another, and so can occur anywhere within the repetition period. In addition, the transmitter clocks are generally not locked to an accurate clock, so the relative TOTs of the sync pulses change over time. For these reasons, a snapshot of the relative TOTs of the synch pulses in a given geographic area provide a signature that can be used to localize user terminal 102.

However, because these TOA signatures change with time, they must be monitored and updated in the signature database of location servers 104. Monitor units 130 are employed for this purpose. That is, monitor units 130 measure TOAs of the sync pulses for received television signals, and then provide these TOAs to location servers 104, which maintain a TOA signature database based on the TOA measurements. Of course, if the television transmitter clocks are locked to an accurate clock to prevent drift, monitor unit(s) 130 are not needed.

Of course, the TOA of a signal differs from its TOT by its time of flight (TOF) from transmitter to receiver. In some cases, the TOF can be large enough to adversely affect TOA matching. Therefore, in some embodiments, location servers 104 use the TOAs, along with knowledge of the locations of monitor units 130, to calculate TOA signatures for one or more locations within each geographic area where users are most likely to be found. For example, a TOA signature can be calculated for the center of a city if no monitor units 130 is located there. Other embodiments use this information, along with knowledge of the locations of the television transmitters 106, to calculate TOT signatures, which are then used to match against the TOA measurements.

User terminals 102 also measure the TOAs of received television signals, and report these TOA measurements to location servers 104. Location servers 104 then compare the reported TOA measurements to the TOA signatures in the TOA signature database to find one or more matches. The geographic locations associated with the matching signatures can be reported to user terminal 102. In the case of multiple matches, these matches can be processed using other techniques to reduce the number of candidate locations.

Figure 3:
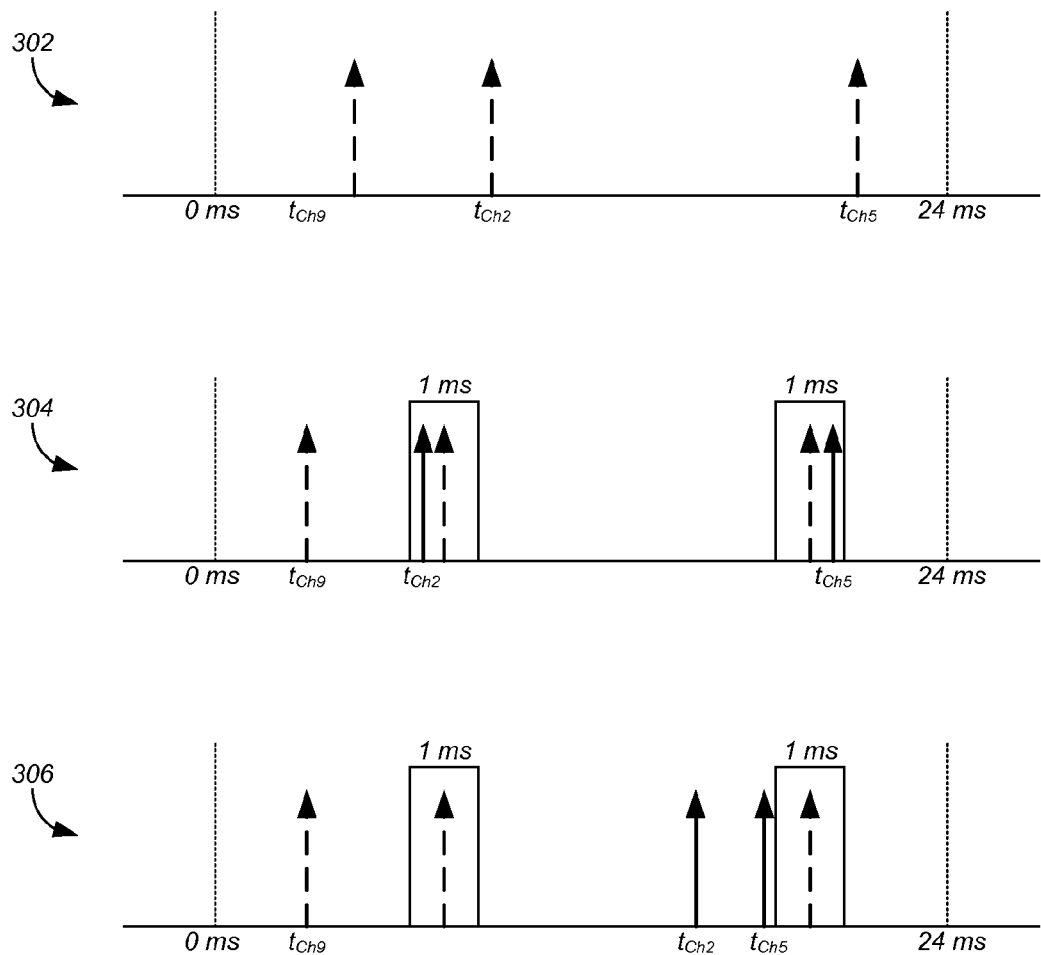
FIG. 3 shows a graphical example of TOA matching for an ATSC signal according to one embodiment.

FIG. 3 shows a graphical example of TOA matching for an ATSC signal according to one embodiment. Referring to FIG. 3, a set of TOA measurements taken by a user terminal 102 is shown as dashed arrows at 302. The measurements are of channels 9, 2, and 5, and are shown as $t_{Ch9}$, $t_{Ch2}$, and $t_{Ch5}$, respectively, within a 24.2 ms sync period window.

In the example of FIG. 3, it is assumed that two locations share the same set of channels, but with different TOTs. These locations can be obtained based on channel matching, described above. The TOT signatures for these two candidate locations are shown as solid arrows at 304 and 306, respectively. Also shown for comparison at 304 and 306 are the TOA measurements. At a glance it is apparent that the TOT signature at 304 is a better match than the TOT signature at 306.

In most cases user terminal 102 does not have knowledge of absolute time. Therefore the comparison is based on the differences between TOAs measured at user terminal 102. The pattern of measured TOA differences can be rotated when matching. This technique is shown in FIG. 3, where the pattern is shifted slightly to the left for matching at 304 and 306.

In addition, because the location of user terminal 102 generally differs from the location at which the TOA signature for the region is determined, the patterns will not match exactly due to TOF differences. This uncertainty in user location can create difference as large as ±100 km (corresponding to 333 μs in time). Match windows are employed to allow for these differences. Match windows are shown as rectangles in FIG. 3 at 304 and 306. The size of the match window can be selected as needed. In some embodiments, with an engineering margin of 167 μs, a search window of ±0.5 ms is used for the TOA matching.

In addition to identifying one or more matching locations, location servers 104 can determine a match quality for each matching location. For example, the squared sum of deviations between TOA measurements and TOTs can be used as a quality measure. A location with a smallest squared sum of deviations can be identified as the user location. The match qualities can be reported to user terminal 102 as well.

In frame matching, the location of user terminal 102 is identified through the use of the contents of predetermined signals received by user terminal 102. That is, the data conveyed by the signals is used to identify the location of user terminal 102. While frame matching is described with respect to digital broadcast television signals in general, and to ATSC signals in particular, any broadcast signal can be used, for example including analog broadcast television signals, broadcast radio signals, navigation aid signals, cellular phone network signals, wireless local area network (LAN) signals, and the like. Analog signals are first digitized before employing the frame matching techniques described below.

Digital broadcast television signals include data segments that can be used for frame matching. For example, the ATSC data segment includes 187 bytes of an MPEG 2 packet (2484 bits or 828 symbols), randomized and interleaved before transmission. The data segments are unique to each frame (or field) and to each television station because each television broadcaster sends different video and audio clips at different times. Therefore, the data segments of digital television broadcast signals can be used to uniquely identify of a television station.

In frame matching, a portion of an ATSC frame (for example, a few data segments) immediately following a field synch segment is captured by both user terminal 102 and one or more monitor units 130 contemporaneously. That is, the portions captured by user terminal 102 and monitor unit(s) 130 must overlap in time to the extent needed to perform frame matching.

Because user terminal 102 and monitor unit(s) 130 must capture the data segments contemporaneously, data capture is coordinated. After establishing approximate timing, for example using a cellular telephone network or the like, frame matching is conducted within a search window set by system timing accuracy (for example ±200 ms). In absence of the network timing, user terminal 102 captures a data segment in every 400 ms for the duration of the maximum local clock offset.

User terminal 102 and monitor unit(s) 130 capture the data segments, and transmit the captured data to location server 104 for frame matching. The sampling rate, resolution (bits/sample), and portion of a frame to be captured (for example, the number of data segments) can be adjusted according to the speed of the network connections and the processing power of location server 104.

Figure 4:
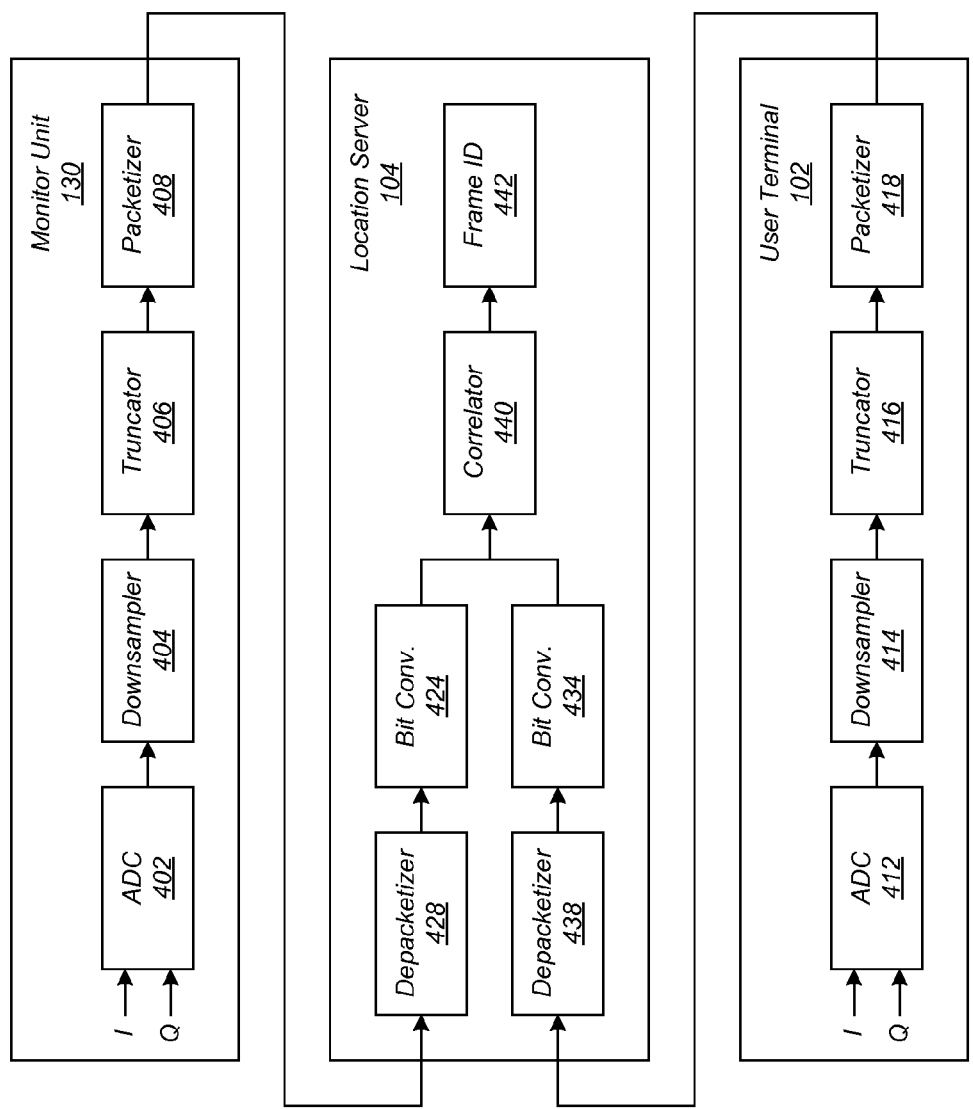
FIG. 4 illustrates frame matching according to one embodiment.

FIG. 4 illustrates frame matching according to one embodiment. Referring to FIG. 4, user terminal 102 includes an analog-to-digital converter (ADC) 402, a downsampler 404, a bit truncator 406, and a packetizer 408. Monitor unit 130 includes an ADC 412, a downsampler 414, a bit truncator 416, and a packetizer 418. Location server 104 includes depacketizers 428, 438, bit converters 424, 434, correlator 440, and frame identifier 442.

User terminal 102 and monitor unit 130 operate similarly, but monitor unit 130 generally collects more data for more channels while user terminal 102 visits only a few channels. ADCs 402, 412 digitize the collected data, for example 8 bits/sample at 26 MHz. To reduce the payload, downsamplers 404, 414 downsample the I (in-phase) and Q (quadrature) baseband samples, for example from 32 kbits to 16 kbits (that is, from 26 MHz to 13 MHz). In addition, bit truncators 406, 416 reduce the number of bits/sample, for example from 8 to 2 (that is, from 16 kbits to 4 kbits). Packetizers 408, 418 packetize the data. For example, in monitor unit 130, packetizer 418 packetizes 17 fields of a channel in 0.7 s (68 kbits), while in user terminal 102, packetizer 408 packetizes 1-17 fields of a channel in 0.7 s (4-68 kbits). User terminal 102 and monitor unit 130 transmit the packets of data to location server 104.

Location server 104 receives the packets of captured data. Depacketizers 428, 438 recover the captured data from the received packets. Bit converters 424, 434 perform data alignment when the data types differ for the data captured by user terminal 102 and monitor unit 130. Correlator 440 correlates the data captured by user terminal 102 and monitor unit 130. Frame identifier 442 determines, based on the correlation profile produced by correlator 440, whether the data captured by monitor unit 130 and user terminal 102 are from the same transmitter 106. Frame identifier 442 can also resolve the clock offset of user terminal 102, which can be used for applications requiring high timing accuracy at user terminal 102, for example to establish timing for indoor devices such as femtocells, routers, and the like.

Figure 5:
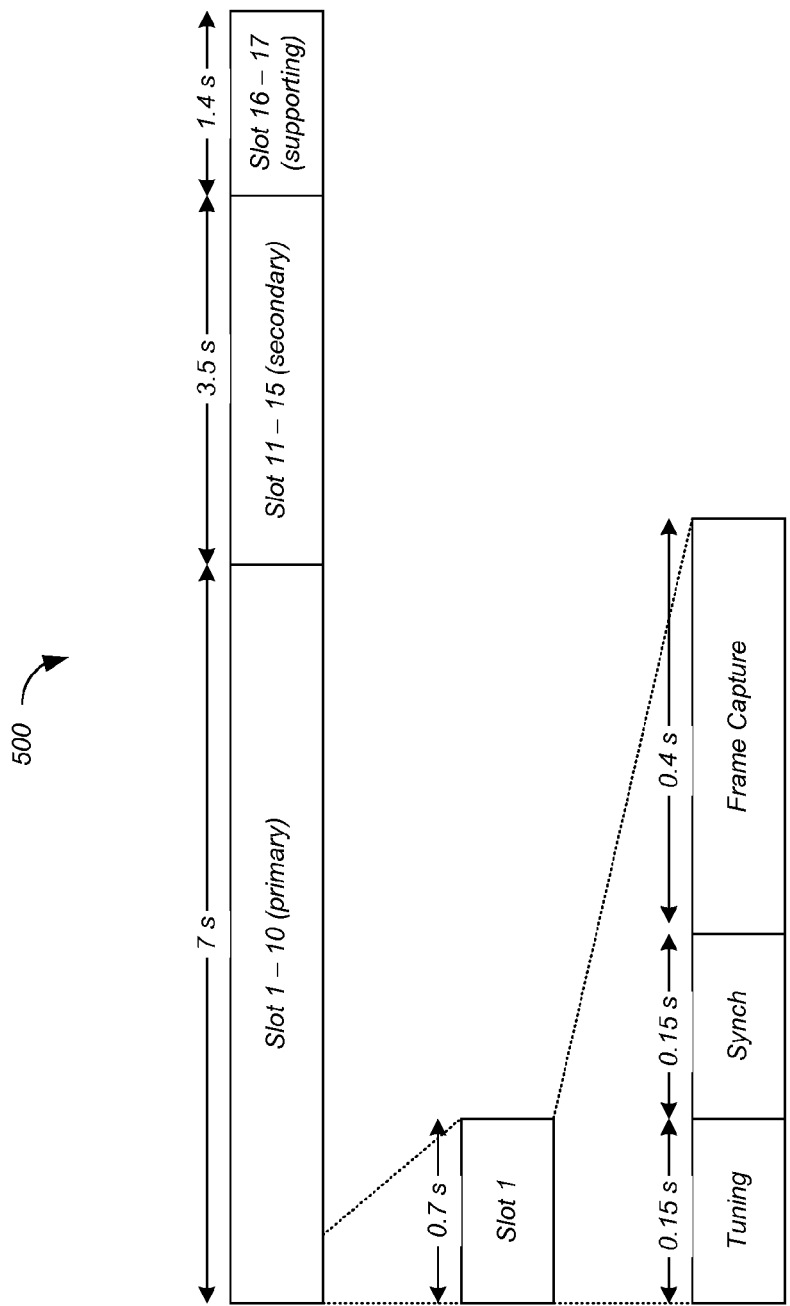
FIG. 5 shows a frame capture schedule 500 according to one embodiment.

To ensure that user terminals 102 and monitor units 130 capture data contemporaneously, a frame capture schedule is employed. The frame capture schedule is a fixed timeline employed by all user terminals 102 and monitor units 130 to visit and capture portions of ATSC frames from specific channels at specific times. FIG. 5 shows a frame capture schedule 500 according to one embodiment.

Referring to FIG. 5, frame capture schedule 500 is repeated every 12 seconds. In frame capture schedule 500, there are 17 time slots, each for one channel for a duration of 700 ms. Each time slot includes 150 ms for tuner settling, 150 ms for synchronization, and 400 ms for frame capture. The 17 frame capture slots are allocated to 40 television channels which have different priorities, categorized by their significance based on a field assessment of their signal power and coverage. The categories include primary, secondary, and supporting.

Table 1 shows a categorized channel schedule according to one embodiment. The higher-priority channels are visited more frequently than the other channels to expedite the frame matching process. The ten highest-priority channels are categorized as primary, and are captured once per schedule period, or every 12 seconds. Thus, a user terminal taking advantage of primary channels can complete the frame capture within 12 seconds. The next ten highest-priority channels are categorized as secondary, and are captured every other schedule period, or every 24 seconds. The next 20 highest-priority channels are categorized as supporting, and are captured every tenth schedule period, or every 120 seconds.

TABLE 1

| Channel Category | Number of channels | Duty Cycle | Slots/minute | Slot Allocation |
| --- | --- | --- | --- | --- |
| Primary | 10 | 12 s | 50 | 1-10 |
| Secondary | 10 | 24 s | 25 | 11-15 |
| Supporting | 20 | 120 s | 10 | 16-17 |

Figure 6:
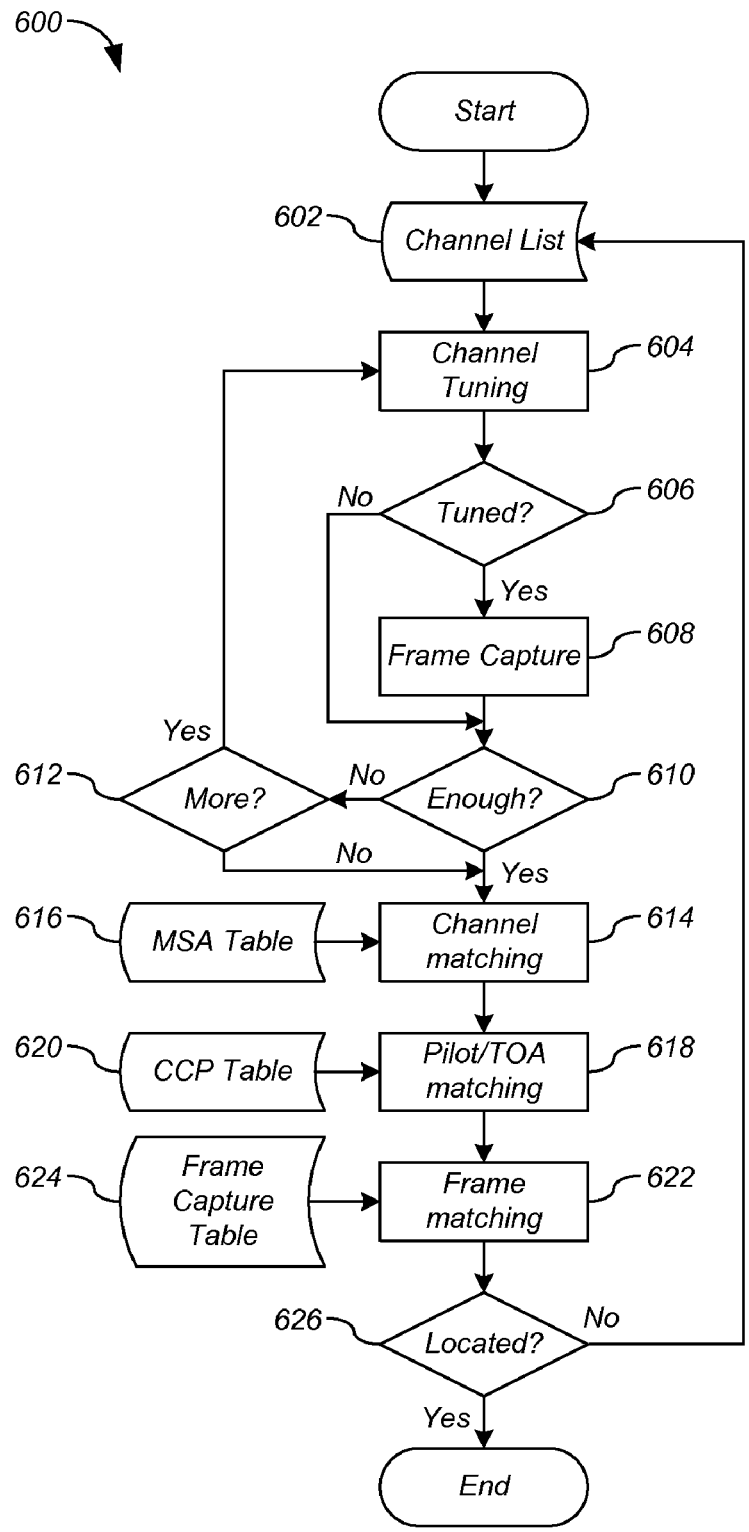
FIG. 6 shows a location identification process 600 according to an embodiment that includes channel matching, pilot matching, TOA matching and frame matching.

The techniques described herein can be used alone or in combination. FIG. 6 shows a location identification process 600 according to an embodiment that includes channel matching, pilot matching, TOA matching and frame matching. Of course, at any point in process 600 where the number of possible locations of user terminal 102 is reduced to one, process 600 can end.

Referring to FIG. 6, process 600 begins with a channel list 602, which can include a frame capture schedule. User terminal 102 begins channel searching, tuning to each channel in channel list 602 (step 604). If tuning succeeds (step 606), user terminal 102 performs frame capture (step 608). If more channels should be checked (step 610), and more channels remain in channel list 602 (step 612), process 600 returns to channel tuning (step 604).

Otherwise, process 600 moves to channel matching (step 614), which can employ data such as a metropolitan statistical area (MSA) table 616. MSA table 616 can include, for each area, the latitude, longitude, and the channels present in that area. Channel matching can be followed by pilot matching and/or TOA matching (step 618), which can employ a channel characteristics packet (CCP) table 620. CCP table 620 can include, for each channel, the time of transmission (TOT) of sync pulses, the pilot frequency offset, and fractional code rate offset. Next process 600 can include frame matching (step 622) based on the data captured in step 608, which can be stored in a frame capture table 624. Frame capture table 624 can include, for each channel, the TOT and captured data. If at this point no location has been identified for user terminal 102 (step 626), process 600 can repeat, for example returning to channel list 602.

Referring again to FIGS. 1 and 2, one or more of a plurality of possible locations of user terminal are selected based on the measurements and a plurality of associations each associating one of the possible locations with expected values for the measurements (that is, the signatures) for that location. In some embodiments, location server 104 performs the selection. According to such embodiments, transmitter 110 of user terminal 102 transmits the measurements to location server 104. Receiver 122 of location server 104 receives the measurements. Processor 118 of location server 104 performs the selection using the received measurements and the associations (that is, the signature database) stored in memory 120. Transmitter 124 optionally sends the selected location(s) to user terminal 102.

In some embodiments, user terminal 102 performs the selection locally. According to such embodiments, processor 114 of user terminal 102 performs the selection using the associations stored in memory 116.

Each city or region is associated with a signature representing the available channels in that area. These expected wireless channel signatures can be created in many ways including the use of published transmitter information, simulation of receivable channels, actual measurements taken from each area, or a combination of these techniques.

Finding a match for a signature within the database is equivalent to finding a "distance" to each of the signatures. Signatures that are "close" to each other represent a good match, while signatures that are "far apart" do not match well. For clarification, consider an environment like the U.S., where there are 67 possible TV channel slots (on/off), 67 slots for channel types (analog/digital), and 67 possible frequency offsets for a theoretical total of 201 "degrees of freedom." Each signature can be thought of as a point within this N-dimensional space and the distance between points will indicate the difference or delta between signatures.

Preferably the distance is determined between a first vector $x_i$ comprising the measurements made by user terminal 102 and one or more second vectors $x_j$ each comprising the expected values of the measurements. When the vectors are represented as $$x_i = [x_{i1}, x_{i2}, \ldots, x_{iN}] \quad (1)$$

and $$x_j = [x_{j1}, x_{j2}, \ldots, x_{jN}] \quad (2)$$

the distance between them can be measured in many ways (e.g., Hamming distance, etc.), but for most cases is it sufficient and easiest to use the standard Euclidian distance equation $$|x_i - x_j| = \sqrt{\sum_{n=1}^{N} (x_{in} - x_{jn})^2} \quad (3)$$

The signatures with the fewest differences have the best matching quality. Each dimension in the "signature space" can be scaled to give each measurement a different weighting to optimize the selectivity between signatures. For example, detecting a digital channel where an analog channel is expected is usually an important indication of a mismatch, whereas detecting a variation in frequency offset (possibly due to small measurement errors) is a weaker indication of signature mismatch. The channel type mismatch is therefore preferably weighted more than the frequency offset deviation. When considered together, after appropriate weighting has been applied, the signature distances indicate the overall signature match quality.

However, most consumer electronic devices can make only relative frequency measurements because the local oscillators used on these devices are usually not referenced to any absolute timing reference (e.g., atomic clocks, GPS, etc.). Thus all frequency measurements from a particular device will have a built-in scaling error. For example, a device might have an oscillator that is 1% faster than nominal. From this device's perspective, all measured frequencies will appear to be about 99.01% of their actual value. No matter what the scaling factor is, it applies to all frequencies equally, so for a scaling factor s and a nominal frequency $F_i$ the measured frequency at the device is given by $$f_i = sF_i \quad (4)$$

Without compensation for this frequency measurement scaling, the estimates of frequency offsets can be severely skewed. For example, a U.S. NTSC TV broadcast on channel 2 has a nominal pilot frequency of 55.250 MHz. A device with a clock that is 0.1% faster than nominal would see this channel at 55.195 MHz, which looks like a negative offset of about 55 kHz. The same receiver would see channel 69, nominally 801.250 MHz, at 800.450 MHz, which looks like a negative offset of about 800 kHz. Higher frequency channels will have larger frequency offset errors.

It is desirable to compensate for the scaling factor, but that value is generally not known and can even drift slowly over time. Therefore, it is not useful to directly compare the measured frequencies $f_i$ with the expected frequencies $F_i$ in the signature database. To negate the effect of the scaling factor, embodiments of the present invention compare frequency ratios instead. That is, ratios of the frequency measurements are compared to corresponding ratios of the expected values for the frequency measurements. This technique is preferably applied to all frequency measurements, including measurement of absolute and offset frequencies. For example, given a second frequency measurement $f_j$ and its expected value $F_j$, the comparison is given by $$\frac{f_i}{f_j} = \frac{sF_i}{sF_j} = \frac{F_i}{F_j} \tag{5}$$

Ratios of measured frequencies should always equal the ratios of theoretically perfect frequencies regardless of the device's frequency scaling error. To compare in units of frequency, both sides of equation (5) can be multiplied by the nominal frequency $F_j$ to yield $$\frac{f_i}{f_j} F_j = F_i \tag{6}$$

Organizing the pairwise ratios of frequencies $f_i$ and $f_j$ in matrix format yields $$\begin{bmatrix} \frac{f_1}{f_1} & \frac{f_1}{f_2} & \cdots & \frac{f_1}{f_N} \\ \frac{f_2}{f_1} & \frac{f_2}{f_2} & \cdots & \frac{f_2}{f_N} \\ \vdots & \vdots & \ddots & \vdots \\ \frac{f_N}{f_1} & \frac{f_N}{f_2} & \cdots & \frac{f_N}{f_N} \end{bmatrix} \tag{7}$$

which is compared against an expected value matrix given by $$\begin{bmatrix} \frac{F_1}{F_1} & \frac{F_1}{F_2} & \cdots & \frac{F_1}{F_N} \\ \frac{F_2}{F_1} & \frac{F_2}{F_2} & \cdots & \frac{F_2}{F_N} \\ \vdots & \vdots & \ddots & \vdots \\ \frac{F_N}{F_1} & \frac{F_N}{F_2} & \cdots & \frac{F_N}{F_N} \end{bmatrix} \tag{8}$$

The relationship in equation (6) allows the rearrangement of the matrix as $$\begin{bmatrix} \frac{f_1}{f_1}F_1 & \frac{f_1}{f_2}F_2 & \cdots & \frac{f_1}{f_N}F_N \\ \frac{f_2}{f_1}F_1 & \frac{f_2}{f_2}F_2 & \cdots & \frac{f_2}{f_N}F_N \\ \vdots & \vdots & \ddots & \vdots \\ \frac{f_N}{f_1}F_1 & \frac{f_N}{f_2}F_2 & \cdots & \frac{f_N}{f_N}F_N \end{bmatrix} \tag{9}$$

which is compared against an expected value matrix given by $$\begin{bmatrix} F_1 & F_1 & \cdots & F_1 \\ F_2 & F_2 & \cdots & F_2 \\ \vdots & \vdots & \ddots & \vdots \\ F_N & F_N & \cdots & F_N \end{bmatrix} \tag{10}$$

where any differences between matrices (9) and (10) indicate a deviation of one or more channels from their expected frequency offsets.

This comparison can be simplified somewhat because comparing a frequency ratio and its reciprocal is redundant. Therefore, the lower triangle of the matrix is discarded, without losing any information. Ratios of frequencies to themselves are also of no use, so all the diagonal elements are discarded as well. The resulting matrices are given by $$\begin{bmatrix} 0 & \frac{f_1}{f_2}F_2 & \cdots & \frac{f_1}{f_N}F_N \\ 0 & 0 & \cdots & \frac{f_2}{f_N}F_N \\ \vdots & \vdots & \ddots & \vdots \\ 0 & 0 & \cdots & 0 \end{bmatrix} \tag{11}$$

and $$\begin{bmatrix} 0 & F_1 & \cdots & F_1 \\ 0 & 0 & \cdots & F_2 \\ \vdots & \vdots & \ddots & \vdots \\ 0 & 0 & \cdots & 0 \end{bmatrix} \tag{12}$$

All the non-zero elements can be collapsed into a simple vector form for easy comparison. For example, for N=4, the vectors are $$\left[\frac{f_1}{f_2}F_2, \frac{f_1}{f_3}F_3, \frac{f_1}{f_4}F_4, \frac{f_2}{f_3}F_3, \frac{f_2}{f_4}F_4, \frac{f_3}{f_4}F_4\right] \tag{13}$$

and $$[F_1, F_1, F_1, F_2, F_2, F_3] \tag{14}$$

This problem is quite manageable for two reasons. First, there is an upper bound to the problem size. The total number of possible broadcast channels in any country is finite and relatively small. Second, only the subset of received channels needs to be compared. Each city typically utilizes a small subset of all the defined channel slots, leaving several open channels for neighboring cities to use. The computation of even several hundred frequency ratios is well within the capability of even modest computing resources. In vector form, it is easy to combine the frequency measurements with the other parts of the TV channel signature and use the normal "distance" calculation in N-dimensional space to determine match quality.

Referring again to FIGS. 1 and 2, once one or more possible locations have been selected for user terminal 102, process 200 optionally determines a precise location of user terminal 102 based on the possible location(s), the wireless signals received by user terminal 102, and locations of transmitters 106 of the wireless signals (step 208). This precise location is preferably performed according to the techniques disclosed in the patent applications cited above, and can be performed by user terminal 102, location server 104, or some combination of the two. When more than one possible location is selected, a precise location can be determined for each. Then the best of the precise locations is selected. Once a precise location for user terminal 102 is known, the wireless signal signature collected by user terminal 102 optionally is used to revise the signature database, for example to correct any errors or to introduce new data (step 210).

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a receiver to receive first measurements of a plurality of wireless television signals, wherein the first measurements are made by a remote device receiving the plurality of wireless television signals; and
a processor to select one or more of a plurality of possible locations of the remote device based on the first measurements and a plurality of associations each associating one of the possible locations with expected values for the first measurements for the one of the possible locations.

2. The apparatus of claim 1:
wherein the receiver receives second measurements of the plurality of wireless television signals, wherein the second measurements are made by one or more monitor units receiving the plurality of wireless television signals, and wherein locations of the one or more monitor units are known; and
wherein the processor generates the expected values for the first measurements and the associations, based on the second measurements and the locations of the one or more monitor units.

3. The apparatus of claim 2:
wherein the wireless television signals include broadcast television signals, wherein the broadcast television signals include synchronization pulses; and
wherein the first measurements and the second measurements include measurements of times of arrival of the synchronization pulses.

4. The apparatus of claim 2:
wherein the wireless television signals include digital broadcast television signals, wherein the digital broadcast television signals include data frames; and
wherein the first measurements and the second measurements include measurements of contents of the data frames, and wherein the first measurements and the second measurements of each digital broadcast television signal occur contemporaneously.

5. The apparatus of claim 1, further comprising:
a transmitter to transmit a signal representing the one or more possible locations of the remote device.

6. The apparatus of claim 1:
wherein the processor determines a precise location of the remote device based on the one or more possible locations, one or more of the plurality of wireless television signals, and locations of transmitters of the one or more of the plurality of wireless television signals.

7. An apparatus comprising:
means for receiving first measurements of a plurality of wireless television signals, wherein the first measurements are made by a remote device receiving the plurality of wireless television signals; and
means for selecting one or more of a plurality of possible locations of the remote device based on the first measurements and a plurality of associations each associating one of the possible locations with expected values for the first measurements for the one of the possible locations.

8. The apparatus of claim 7:
wherein the means for receiving receives second measurements of the plurality of wireless television signals, wherein the second measurements are made by one or more monitor units receiving the plurality of wireless television signals, and wherein locations of the one or more monitor units are known; and
wherein the means for processing generates the expected values for the first measurements and the associations, based on the second measurements and the locations of the one or more monitor units.

9. The apparatus of claim 8:
wherein the wireless television signals include broadcast television signals, wherein the broadcast television signals include synchronization pulses; and
wherein the first measurements and the second measurements include measurements of times of arrival of the synchronization pulses.

10. The apparatus of claim 8:
wherein the wireless television signals include digital broadcast television signals, wherein the digital broadcast television signals include data frames; and
wherein the first measurements and the second measurements include measurements of contents of the data frames, and wherein the first measurements and the second measurements of each digital broadcast television signal occur contemporaneously.

11. The apparatus of claim 7, further comprising:
means for transmitting a signal representing the one or more possible locations of the remote device.

12. The apparatus of claim 7:
wherein the means for processing determines a precise location of the remote device based on the one or more possible locations, one or more of the plurality of wireless television signals, and locations of transmitters of the one or more of the plurality of wireless television signals.

13. A method comprising:
receiving first measurements of a plurality of wireless television signals, wherein the first measurements are made by a remote device receiving the plurality of wireless television signals; and
selecting one or more of a plurality of possible locations of the remote device based on the first measurements and a plurality of associations each associating one of the possible locations with expected values for the first measurements for the one of the possible locations.

14. The method of claim 13, further comprising:
receiving second measurements of the plurality of wireless television signals, wherein the second measurements are made by one or more monitor units receiving the plurality of wireless television signals, and wherein locations of the one or more monitor units are known; and
generating the expected values for the first measurements and the associations, based on the second measurements and the locations of the one or more monitor units.

15. The method of claim 14:
wherein the wireless television signals include broadcast television signals, wherein the broadcast television signals include synchronization pulses; and
wherein the first measurements and the second measurements include measurements of times of arrival of the synchronization pulses.

16. The method of claim 14:
wherein the wireless television signals include digital broadcast television signals, wherein the digital broadcast television signals include data frames; and
wherein the first measurements and the second measurements include measurements of contents of the data frames, and wherein the first measurements and the second measurements of each digital broadcast television signal occur contemporaneously.

17. The method of claim 13, further comprising:
transmitting a signal representing the one or more possible locations of the remote device.

18. The method of claim 13, further comprising:
determining a precise location of the remote device based on the one or more possible locations, one or more of the plurality of wireless television signals, and locations of transmitters of the one or more of the plurality of wireless television signals.

19. Computer-readable media embodying instructions executable by a computer to perform a method comprising:
receiving first measurements of a plurality of wireless television signals, wherein the first measurements are made by a remote device receiving the plurality of wireless television signals; and
selecting one or more of a plurality of possible locations of the remote device based on the first measurements and a plurality of associations each associating one of the possible locations with expected values for the first measurements for the one of the possible locations.

20. The computer-readable media of claim 19, further comprising:
receiving second measurements of the plurality of wireless television signals, wherein the second measurements are made by one or more monitor units receiving the plurality of wireless television signals, and wherein locations of the one or more monitor units are known; and
generating the expected values for the first measurements and the associations, based on the second measurements and the locations of the one or more monitor units.

21. The computer-readable media of claim 20:
wherein the wireless television signals include broadcast television signals, wherein the broadcast television signals include synchronization pulses; and
wherein the first measurements and the second measurements include measurements of times of arrival of the synchronization pulses.

22. The computer-readable media of claim 20:
wherein the wireless television signals include digital broadcast television signals, wherein the digital broadcast television signals include data frames; and
wherein the first measurements and the second measurements include measurements of contents of the data frames, and wherein the first measurements and the second measurements of each digital broadcast television signal occur contemporaneously.

23. The computer-readable media of claim 19, wherein the method further comprises:
causing transmission of a signal representing the one or more possible locations of the remote device.

24. The computer-readable media of claim 19, wherein the method further comprises:
determining a precise location of the remote device based on the one or more possible locations, one or more of the plurality of wireless television signals, and locations of transmitters of the one or more of the plurality of wireless television signals.

* * * * *